No. 738,488. PATENTED SEPT. 8, 1903.
A. ROSENTHAL.
CORN HUSKING AND SHREDDING MACHINE.
APPLICATION FILED JUNE 19, 1903.

NO MODEL.

Witnesses.
Inventor.
August Rosenthal
By Benedick & Morsell
Attorneys

No. 738,488. Patented September 8, 1903.

UNITED STATES PATENT OFFICE.

AUGUST ROSENTHAL, OF MILWAUKEE, WISCONSIN, ASSIGNOR TO ROSENTHAL CORN HUSKER COMPANY, OF MILWAUKEE, WISCONSIN, A CORPORATION OF WISCONSIN.

CORN HUSKING AND SHREDDING MACHINE.

SPECIFICATION forming part of Letters Patent No. 738,488, dated September 8, 1903.

Application filed June 19, 1903. Serial No. 162,146. (No model.)

*To all whom it may concern:*

Be it known that I, AUGUST ROSENTHAL, residing in Milwaukee, in the county of Milwaukee and State of Wisconsin, have invented a new and useful Improvement in Corn Husking and Shredding Machines, of which the following is a description, reference being had to the accompanying drawings, which are a part of this specification.

My invention has relation to improvements in corn husking and shredding machines, and relates more especially to mechanism for bagging the shelled corn and for separating therefrom all dirt or foreign matter previous to said shelled corn being deposited in the receiving bag or receptacle.

The object of the invention is to provide simple mechanism for accomplishing the above-mentioned function, and with this object in view it consists of the devices and parts or their equivalents as hereinafter set forth.

Figure 1:
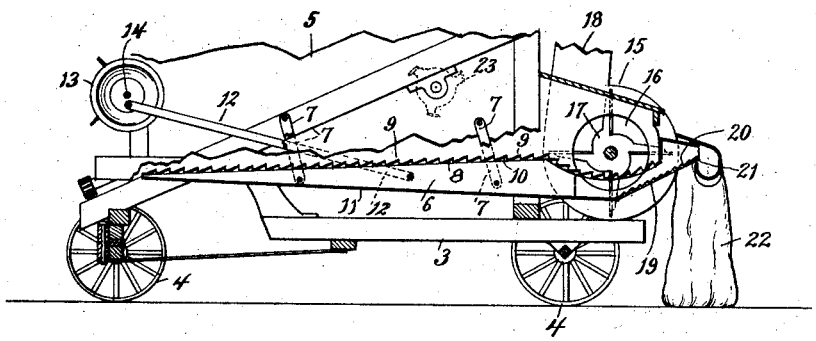
Figure 2:
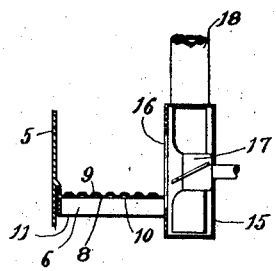

In the accompanying drawings, Figure 1 is a side elevation of the lower portion of a corn husking and shredding machine, showing my improvements applied thereto, parts being broken away; and Fig. 2 is a central transverse section through the fan-drum and trough adjacent to said drum.

Referring to the drawings, the numeral 3 indicates the truck of the machine, which is preferably mounted on wheels 4 in order to make the machine portable. Mounted on the truck is a box-like structure or frame 5, of any desired construction best adapted for supporting the operating mechanism and for inclosing parts of the same.

The usual husking-rolls employed in this class of machines and which are located in the upper portion of the frame are not shown in the accompanying drawings, inasmuch as they form no part of the present invention.

Referring to the improvements, the numeral 6 indicates a shaking double-bottom trough, which is located in the lower portion of the frame below the husking-rolls. This trough is swingingly hung on links 7 7, pivoted at their lower ends to opposite side pieces of the trough and at their upper ends to the fixed framework. The upper bottom piece 8 of the trough is formed with a series of projections or ribs 9 and with a series of openings 10. The lower bottom piece 11 is reticulated or perforated, and is, therefore, in the form of a screen. This bottom piece is on a slight downward slant toward the forward end of the machine. A shaking or agitating motion is imparted to the trough by means of a pitman 12, connected at one end to the trough and at its opposite end to a wrist-pin projecting from a wheel 13, mounted on a shaft 14 at the rear of the machine, said shaft being rotated by any desirable means, as from any suitable rotatable part of the mechanism.

At the forward end of the machine is a fan-drum 15, having at one side an opening 16. Within the drum is an ordinary form of fan 17. Leading from the fan-drum is a discharge-spout 18, into which the cut and shredded material is forced by the action of the fan and blown therethrough to the place of deposit.

The forward end of the upper bottom piece 8 of the trough is preferably of concave form and is extended across the opening 16 of the fan-drum. At the forward end of the lower bottom piece 11 is a short upwardly-inclined imperforated extension 19, having on its upper side a series of projections 20. This extension 19 forms a passage between it and the under side of the concave forward portion of the upper bottom piece 8. The forward extremity of the extension merges into and forms a part of a spout 21, which is adapted to discharge into a bag 22.

In the operation of the invention the husks and cornstalks pass between the husking-rolls, as usual in this class of inventions, while the husked ears of corn slide down the rolls into a suitable receptacle. The cornstalks and husks which pass between the rolls are acted upon by the cutting mechanism (a portion of which is indicated in dotted lines in Fig. 1 and designated by the numeral 23) and after being cut and broken up drop onto the upper bottom piece 8 of the shaking-trough. By reason of the fact that the trough is subjected to a continual shaking motion or agitation the cut and shredded stalks, owing to the peculiar formation of the projections 9, are forced forwardly and onto the curved forward portion of the bottom piece 8 and are then sucked through the opening 16 into the fan-drum, where they are forced by the action of the fan up the discharge-spout 18 to the place of deposit. Any dross or dirt which may pass downwardly with the cut cornstalks and fall onto the upper bottom piece 8 is, through the shaking motion of the trough, caused to pass through the openings 10 in said bottom piece and fall onto the lower bottom piece 11 and through the perforation thereof to the ground. In this way dirt, dross, or other foreign matter is to a large extent prevented from being carried into the fan-drum with the cut and shredded cornstalks and husks. If in the operation of husking any corn should be shelled from the ears and pass between the husking-rolls, said shelled corn will fall onto the upper bottom piece 8, thence through the openings thereof, and onto the lower bottom piece 11. The perforations of the bottom piece 11 are too small to permit the kernels of corn to pass therethrough, and in view of the fact that said bottom piece is on a slight declination toward the forward end of the machine the kernels of corn will slide down said bottom piece and onto the upward-inclined terminal extension 19 of said bottom piece, where they are acted upon by the teeth 20 of said extension, and, owing to the shaking motion of the trough, said kernels will then be carried through the passage between the extension 19 and the under side of the concaved forward end of the upper bottom piece, and thence through the spout 21 and into the bag 22, it being understood that the kernels are too heavy to be sucked in through the opening 16 of the fan-drum. If by any chance any dirt, dross, or like material should fail to pass through the perforations of the lower bottom piece and should be carried along with the kernels of corn, said dross or like material the moment it reaches the opening 16 of the fan-drum will be drawn through said opening and blown upwardly through the discharge-spout and be thereby prevented from being mixed with the kernels of corn and discharged into the bag 22, whereby the kernels of corn are deposited in the bag in a thoroughly clean condition.

What I claim as my invention is—

1. In a corn husking and shredding machine, the combination of a fan-drum provided with an opening, and also provided with a discharge-spout, a double-bottom shaking-trough, the upper bottom piece thereof provided with a series of projections and with a series of openings, said upper bottom piece extended to the opening of the fan-drum, and the lower bottom piece provided with a series of perforations, and at one end provided with an upward imperforate extension which lies beneath the portion of the upper bottom piece which extends adjacent to the opening of the fan-drum, a passage being formed between the two, said upward extension provided on its upper side with a series of projections, which as the trough is agitated, forces the material thereon to a bag or receptacle at the outer end of said upward extension.

2. In a corn husking and shredding machine, the combination of a fan-drum, provided with an opening, and also provided with a discharge-spout, a double-bottom shaking-trough, the upper bottom piece thereof provided with a series of projections and with a series of openings, said upper bottom piece extended to the opening of the fan-drum, and the lower bottom piece being on a gradual decline toward the fan-drum and provided with a series of perforations, and at one end provided with an upward imperforate extension which lies beneath the portion of the upper bottom piece which extends adjacent to the opening on the fan-drum, a passage being formed between the two, said upward extension provided on its upper side with a series of projections, which, as the trough is agitated, forces the material thereon to a bag or receptacle at the outer end of said upward extension.

3. In a corn husking and shredding machine, the combination of a fan-drum provided with an opening, and also provided with a discharge-spout, a double-bottom shaking-trough, the upper bottom piece thereof provided with a series of projections and with a series of openings, said upper bottom piece being extended to the opening of the fan-drum, and the lower bottom piece of the trough provided with a series of perforations, and at one end provided with an upward imperforate extension which lies beneath the portion of the upper bottom piece which extends adjacent to the opening of the fan-drum, a passage being formed between the two, and said upward extension being provided on its upper side with a series of projections, and terminating at its end in a discharge-spout, the said projections, as the trough is agitated, forcing the material thereon to a bag or receptacle at the mouth of the discharge-spout which terminates the upward extension.

4. In a corn husking and shredding machine, the combination of a fan-drum provided with an opening, and also provided with a discharge-spout, a double-bottom shaking-trough, the upper bottom piece thereof provided with a series of projections and with a series of openings, said upper bottom piece extended to the opening of the fan-drum, and said extended portion being concave, and the lower bottom piece of the trough provided with a series of perforations, and at one end provided with an upward imperforate extension which lies beneath the portion of the upper bottom piece which extends adjacent to the opening of the fan-drum, a passage being formed between the two, said upward extension provided on its upper side with a series of projections, which, as the trough is agitated, forces the material thereon to a bag or receptacle at the outer end of said upward extension.

In testimony whereof I affix my signature in presence of two witnesses.

AUGUST ROSENTHAL.

Witnesses:
  A. L. MORSELL,
  ANNA F. SCHMIDTBAUER.